Patented Apr. 13, 1954

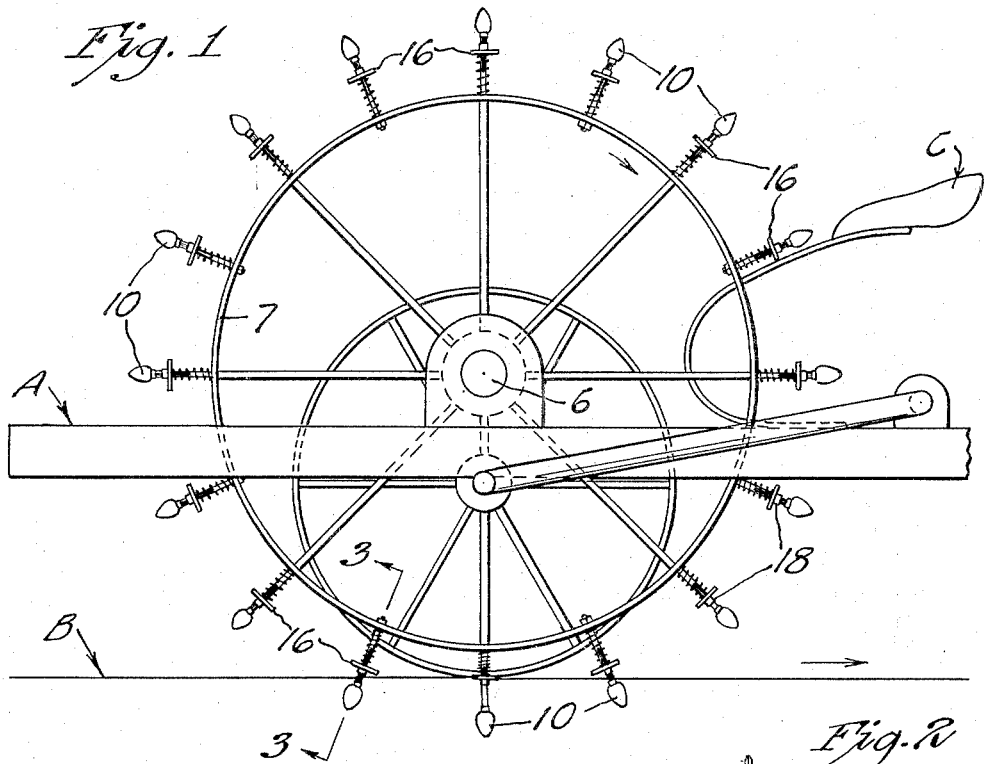
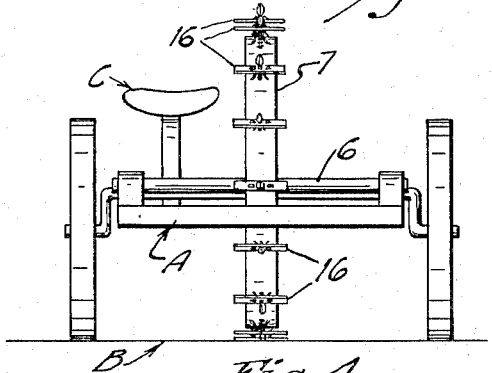
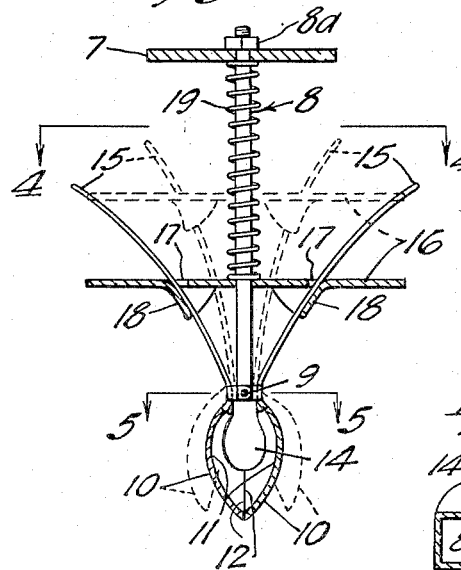
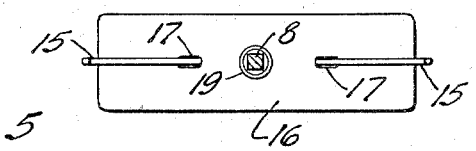
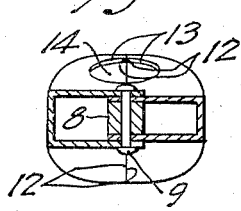

2,674,962

UNITED STATES PATENT OFFICE 2,674,962

SET ONION PLANTING MACHINE

Bogoia Strezoff, Minneapolis, Minn.

Application August 21, 1950, Serial No. 180,529

6 Claims. (Cl. 111—89)

This invention relates to planters. More particularly it relates to a mechanism designed for planting set onions and the like.

In the planting of certain types of plants such as set onions it is imperative for optimum growing conditions that the plant be inserted and maintained in a substantially vertical position in the ground with the portion, which at a later stage of growth, is to extend above the surface of the ground extending upwardly. Many planters have been devised for planting various seeds and plants but none have provided a means for insuring that the set onions or the like will be properly oriented beneath the surface of the ground when the planting operation has been completed. Even if the onion were dropped properly, most of these planters would disturb the position and orientation of the set onion during the removal of the depositing mechanism from the ground.

It is an object of my invention to provide planting apparatus for set onions and the like which will insure that the onions planted thereby will be inserted beneath the surface of the ground at optimum orientation for proper growth.

Another object is to provide planting apparatus for set onions and the like which will not disturb the planted onion from its proper position through the withdrawal of the depositing mechanism from the soil.

These and other objects and advantages of my invention will more fully appear from the following description made in connection with the accompanying drawings, wherein like reference characters refer to similar parts throughout the several views and in which;

Fig. 1 is a fragmentary side elevational view of one embodiment of my invention with the normal number of depositing mechanisms shown attached;

Fig. 2 is a rear elevational view of the same on a smaller scale;

Fig. 3 is a sectional view on an enlarged scale taken along line 3—3 of Fig. 1;

Fig. 4 is a horizontal sectional view taken along line 4—4 of Fig. 3;

Fig. 5 is a sectional view on an enlarged scale taken along line 5—5 of Fig. 3.

One embodiment of my invention as shown in Figs. 1-5 includes a wheeled frame indicated generally as A which is adapted to be propelled over the ground surface indicated generally as B and which has a seat member indicated generally as C adjacent its forward portion and facing toward its rear.

A shaft 6 is rotatably mounted on the frame A for free rotation. Mounted on shaft 6 is a wheel-like member 7 of sufficient diameter with respect to the diameter of the wheels on the frame A and with respect to the position of the shaft 6 to cause the outer periphery of the wheel-like member 7 to lie in close proximity with the ground surface B. Mounted on the outer periphery of the wheel-like member 7 by welding or other suitable means of fastening or by threaded burrs 8a are a plurality of prongs or rods 8. These prongs or rods 8 extend outwardly and radially with respect to the wheel-like member 7 as shown in Fig. 1 and are preferably equi-spaced. Fig. 1 shows the wheel-like member 7 with only a few of the proposed plurality of prongs 8 secured thereto. In actual operation similar prongs will be arranged around the entire periphery of the wheel-like member 7.

Pivotally mounted by a pivot pin 9 on the outer end portion of each of the prongs 8 is a pair of ground-piercing elements 10. The axis of the pivot pin 9 is disposed at right angles to the axis of the shaft 6. Each extends in the direction of movement of the wheel-like member 7 as it rotates on the shaft 6. Each of the ground-piercing elements 10, as shown, may be spoon shaped to provide concave inner surfaces 11 and registering side edges 12 when in substantially vertical position. As best shown in Fig. 5 each of the ground-piercing elements has a cutout portion 13 in one of its side edges and this cutout portion is opposite and communicating with the cutout portion of the opposite ground-piercing member to form an aperture 14 for receiving the set onion therethrough. The upper portions of the ground-piercing elements 10 are bent into substantially U shape, as best shown in Fig. 5, to form brackets for pivotal mounting of the same on the pivot pin 9. Each of the ground-piercing elements 10 has an arm 15 which extends inwardly with respect to the axis of rotation of the wheel-like member and laterally with respect to the plane of the wheel-like member, as best shown in Fig. 3.

Mounted on each of the rods 8 in free sliding relation thereto is a guide plate or control plate 16. As shown this control plate 16 is pierced by the prong 8, extends transversely to the wheel-like member 7, and is provided with a pair of spaced control apertures 17 through which the arms 15 of the respective ground-piercing element 10 extends. Each one of these control apertures 17 is in the form of relatively narrow slots. Depending from each of the control plates 16 on each side of each control aperture 17 is a guidewall 18. Mounted on the rod 8 in surrounding relation thereto is a coiled spring 19 which is disposed between the wheel-like member 7 and the control plate 16 to constantly urge the latter outwardly and consequently to constantly urge through the action of the arms 15 the ground-piercing elements 10 toward closed position.

In operation, each pair of the ground-piercing elements 10 is normally held in closed position as shown in solid lines in Fig. 3. This is accomplished through the action of the spring 19 constantly pressing outwardly against the control plate 16. As a result of the outward urging of the control plate 16 the arms 15 are urged laterally and the side edges 12 of the ground-piercing elements 10 are maintained in registering relation. As the frame A is drawn forwardly in the direction indicated by the arrow in Fig. 1 the wheel-like member 7 is caused to rotate through the engagement of the ground surface B by the prongs 8 and their ground-piercing elements. The operator of the planter sits upon the seat C and manually or in any other convenient and effective manner inserts a set onion through the aperture 14 with proper orientation so that the portion thereof which should extend upwardly when properly planted extends inwardly toward the wheel-like member 7.

As the wheel-like member 7 rotates and the respective prongs 8 engage the ground surface B the respective control plate 16 will come in contact with the ground surface B and will be urged inwardly toward the wheel-like member 7 thereby compressing the spring 19. The inward movement of the plate 16 draws the two arms 15 toward each other to the broken line position shown in Fig. 3 and thereby causes the respective ground-piercing elements 10 to spread away from each other to open position which is also shown in broken lines in Fig. 3. This, of course, releases the set onion in proper growing position.

After the set onion has been released the ground-piercing elements 10 are maintained for a considerable time in their laterally spread position with respect to the direction of movement of the wheel-like member 7. This is the result of the fact that the control plate 16 will remain in contact with the ground surface B and urged at least partially to an inward position as best shown and represented by the ground-piercing mechanism in engagement with the ground farthest to the left of Fig. 1. By the time the prong and its ground-piercing elements have reached the position shown farthest to the left in Fig. 1 the ground-piercing elements 10 are entirely clear of the set onion which it deposited and there is no chance that these elements will disrupt or disturb the positioning of the set onion. This is in contrast to what normally takes place when such a mechanism is oriented on an axis parallel to the axis of the wheel-like member 7. In such a case one of the ground-piercing elements would normally disturb the positioning of the set onion as a normal result of its progression through the soil and its withdrawal therefrom. Once the plate 16 is clear of the ground the spring 19, of course, will urge it outwardly and thereby cause the ground-piercing elements to return to closed position.

It should be noted that by using my invention there is no possibility that the set onion can be turned or twisted so that the portion which should extend upwardly when properly planted will be in an otherwise position. In this regard, the oval or egg shape of the onion receiving area between the two ground-piercing elements 10 should be noted. This oval shaped area is provided, of course, as the result of the inner concave surfaces 11 and the elongated shape of the ground-piercing elements 10.

Since the ground-piercing elements 10 when moved to open position extend laterally with respect to the direction of movement of the wheel-like member 7 there is no danger that one of these elements 10 will thereafter engage the onion which it has just deposited to disturb the orientation of the same. In other words there is no danger even though the onion has been deposited in proper position that the depositing mechanism will disturb the position of the onion to destroy the purpose of the entire device. This has been one of the chief objections to planting devices previously known. With my device the operator is assured that not only will the set onion be deposited in a position so necessary for proper growth for this type of plant, but he is also assured that after such deposition it will not be disturbed through the withdrawal of the depositing mechanism. Instead the loose earth is permitted to fold inwardly and to maintain the set onion in such position.

It will, of course, be understood that various changes may be made in the form, details, arrangement and proportions of the various parts without departing from the scope of my invention.

What I claim is:

1. In a planter, a wheel-like member mounted for rotary movement about a horizontal axis of rotation, and planting mechanism mounted on the circumferential periphery of said wheel-like member, said planting mechanism including at least a pair of movably mounted ground piercing elements having concave surfaces facing toward each other and substantially in contact with each other to constitute a closed position to carry therebetween the seed or plant to be planted and movable to a spread or open position to discharge the same, such movement being in a direction transverse to the direction of rotary movement of said wheel-like member, and ground-pressure-activated mechanism mounted on said member and connected to said elements in surrounding relation and moving said elements to open position when they are in ground piercing relationship whereby the seed or plant to be planted may be deposited beneath the surface of the ground in optimum position for growth, said ground-pressure-activated mechanism being disposed substantially entirely outside the periphery of said wheel-like member.

2. In a planter, a wheel-like member mounted for rotary movement about a horizontal axis of rotation, and ground piercing means mounted on said wheel-like member adjacent its outer periphery in position to engage the ground as said wheel-like member is rotated, said means including a rod extending substantially radially with respect to said member, a guide plate carried by said rod and disposed transversely with respect to the plane of said member and movable toward the axis of rotation of said member as a result of contact with the ground during rotation of said member, means for constantly urging said plate outwardly away from said member, and a pair of ground piercing elements swingably mounted on the outer end portion of said rod and normally substantially in contact to constitute a closed position and movable to a spread or open position, each of said elements having an arm extending through said guide plate for movement thereby to move said elements from closed position to open position and vice versa, said guide plate being adapted to move said elements to open position when moved by the ground toward the axis of rotation of said member, said ground piercing elements being adapted to receive and carry the plant or seed to be planted while being held in closed position by said plate and to discharge the same when moved to open position by said plate.

3. In a planter, a wheel-like member mounted for rotary movement about a horizontal axis of rotation, a plurality of spaced radially extending prongs mounted on the circumferential periphery of said wheel-like member, a pair of ground piercing elements mounted on at least one of said prongs in ground engaging position and for swinging movement in a direction transverse to the direction of the rotary movement of said wheel-like member, said pair of elements being normally substantially in contact to constitute a closed position and movable to a spaced or open position and being adapted to receive and carry therebetween while in closed position a seed or plant to be planted and to discharge the same when moved to open position, and ground actuated control means disposed substantially entirely outside the periphery of said member and encircling said ground piercing elements and moving the same to open position when the latter are in ground piercing position and for moving and maintaining said elements in closed position when not in ground piercing position.

4. Planting apparatus for planting set onions and the like comprising a wheel-like frame, a wheel-like member mounted on said frame for rotary movement about a horizontal axis of rotation, a plurality of outwardly and radially extending prongs mounted on said wheel-like member adjacent its outer periphery, a pair of ground piercing elements pivotally mounted by their medial portions on at least one of said prongs, a control plate carried by said prongs in free sliding relation thereto between the outer periphery of said member and the pivotal axis of said elements and extending transversely thereto, each of said elements having a control arm extending inwardly toward the axis of rotation of said member and in opposite lateral directions with respect to the plane of said member and through said control plate for control thereby, said plate being moved inwardly as a result of contact with the ground during rotation of said member and serving to move the arms of said elements, and means for constantly urging said plate toward the pivotal axis of said element and consequently said arms away from each other to maintain said elements in contact constituting a closed position when not in ground piercing position, said arms being adapted to receive and carry an onion set or the like while in closed position and adapted to discharge the same when moved to a spread or open position by said plate as a result of said plate being forced inwardly by the ground when said elements are in ground piercing position.

5. Planting mechanism for mounting on the outer periphery of a wheel-like member comprising an outwardly and substantially radially extending prong secured by its inner end to the outer periphery of the wheel-like member, a pair of ground piercing elements pivotally mounted by their medial portions on the outer end portion of said prongs for pivotal movement about an axis parallel to a line in the plane of rotation of said wheel-like member and tangent to said outer periphery at the point wher said prong is secured thereto, said elements being adapted when in closed position to receive and carry therebetween the seed or plant to be planted and adapted when in spread position to discharge the same, a control plate carried by said prong between the pivotal axis of said elements and the axis of rotation of said member in free sliding relation to said prong and extending transversely relative to said wheel-like member, said control plate having spaced control apertures formed therein, said plate being moved inwardly as a result of contact with the ground during rotation of said member and serving to move said elements, and means for constantly urging said control plate toward the outer end of said prong, each of said elements having an arm extending laterally with respect to the plane of said member and inwardly through said control apertures toward the axis of rotation of said member to cooperate with said control plate to cause said elements to be maintained in closed position when said elements are not in ground piercing position and to cause said elements to move to spread position to release the seed or plant it may carry when said elements are in ground piercing position and said control plate is moved inwardly by the ground.

6. The structure defined in claim 5, each of said ground piercing elements having a concave surface facing the other and each having an opposite cut-out portion in one of its sides to receive the seed or plant therethrough while said elements are in closed position.

References Cited in the file of this patent

UNITED STATES PATENTS

| Number | Name | Date |
|---|---|---|
| 8,877 | Stowell et al. | Apr. 13, 1852 |
| 371,459 | Hill | Oct. 11, 1887 |
| 452,181 | Fountain | May 12, 1891 |
| 490,942 | Bender | Jan. 31, 1893 |
| 501,449 | Shanks | July 11, 1893 |
| 509,792 | Craft | Nov. 28, 1893 |
| 602,894 | Cheeseman | Apr. 26, 1898 |
| 1,604,624 | White | Oct. 26, 1926 |

FOREIGN PATENTS

| Number | Country | Date |
|---|---|---|
| 1,564 | Great Britain | 1870 |
| 174,300 | Germany | Sept. 20, 1906 |
| 279,328 | Germany | Oct. 17, 1914 |